United States Patent [19]

Hollifield et al.

[11] 4,443,421

[45] Apr. 17, 1984

[54] PROCESS FOR REMOVING PARTICULATE IMPURITIES FROM AQUEOUS PHOSPHORIC ACID

[75] Inventors: Charles M. Hollifield, Lake City; Teddy D. Smith, Jasper, both of Fla.

[73] Assignee: Occidental Chemical Corporation, Houston, Tex.

[21] Appl. No.: 358,744

[22] Filed: Mar. 16, 1982

[51] Int. Cl.$^3$ ............................................. C01B 25/16
[52] U.S. Cl. .............................. 423/321 R; 423/319; 423/320; 210/785; 210/791
[58] Field of Search ........... 423/320, 167, 319, 321 R; 210/785, 767, 768, 791

[56] References Cited

U.S. PATENT DOCUMENTS

| | | | |
|---|---|---|---|
| 870,727 | 11/1907 | Kneuper | 210/785 |
| 1,214,152 | 1/1917 | Ginter | 210/785 |
| 3,528,771 | 9/1970 | Shearon et al. | 23/165 |
| 3,642,439 | 2/1972 | Moore et al. | 23/165 |
| 3,907,680 | 9/1975 | Hill | 210/71 |
| 4,121,968 | 10/1978 | Wells | 162/290 |
| 4,136,199 | 1/1979 | Mills | 423/321 |
| 4,164,550 | 8/1979 | Hill | 423/321 |
| 4,235,854 | 11/1980 | Smith et al. | 423/320 |
| 4,243,643 | 1/1981 | Mills | 423/319 |
| 4,299,804 | 11/1981 | Parks et al. | 423/321 |
| 4,303,524 | 12/1981 | Richards et al. | 210/406 |
| 4,313,919 | 2/1982 | Richards et al. | 423/320 |

OTHER PUBLICATIONS

Mills and Newsom, Method of Removing Suspended Solids from Phosphoric Acid, Ser. No. 107,715, filed 12/27/79.
Smith, Animal Feed Supplement and Process of Manufacture, Ser. No. 206,785, filed 11/14/80.

Primary Examiner—Gregory A. Heller
Attorney, Agent, or Firm—Barry A. Bisson; Forrest E. Logan

[57] ABSTRACT

An emobodiment of a process for filtration of a slurry containing fine particles is a process comprising:

(a) filtering phosphoric acid containing sludge-forming particulate impurities through a fabric filter whereby particulate impurities are separated from the phosphoric acid and retained on the surface of the fabric filter to form a filter cake comprising particulate impurities and entrained phosphoric acid;

(b) contacting the filter cake with a wash fluid (e.g., water) to remove a major portion of the entrained phosphoric acid from the filter cake, thereby forming a washed filter cake; and, (c) removing the washed filter cake to expose a fresh surface of the fabric filter, for contacting with additional phosphoric acid containing particulate impurities.

Preferably, the washed filter cake is removed by the introduction of pressurized air to the side of the fabric filter opposite the washed filter cake.

23 Claims, 9 Drawing Figures

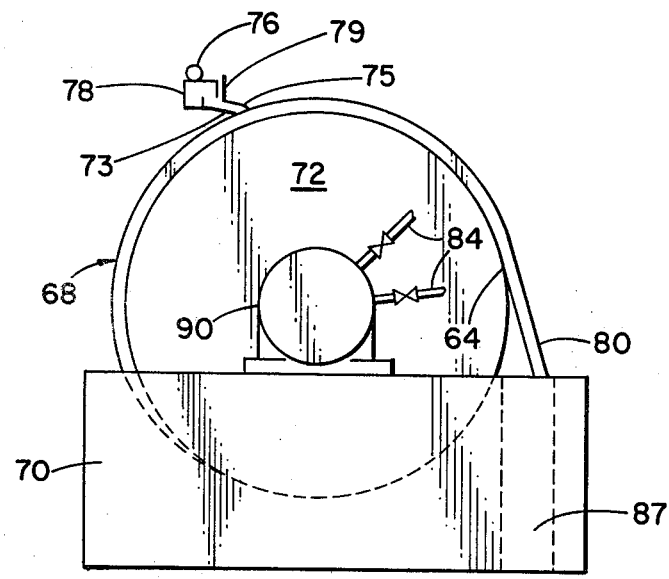
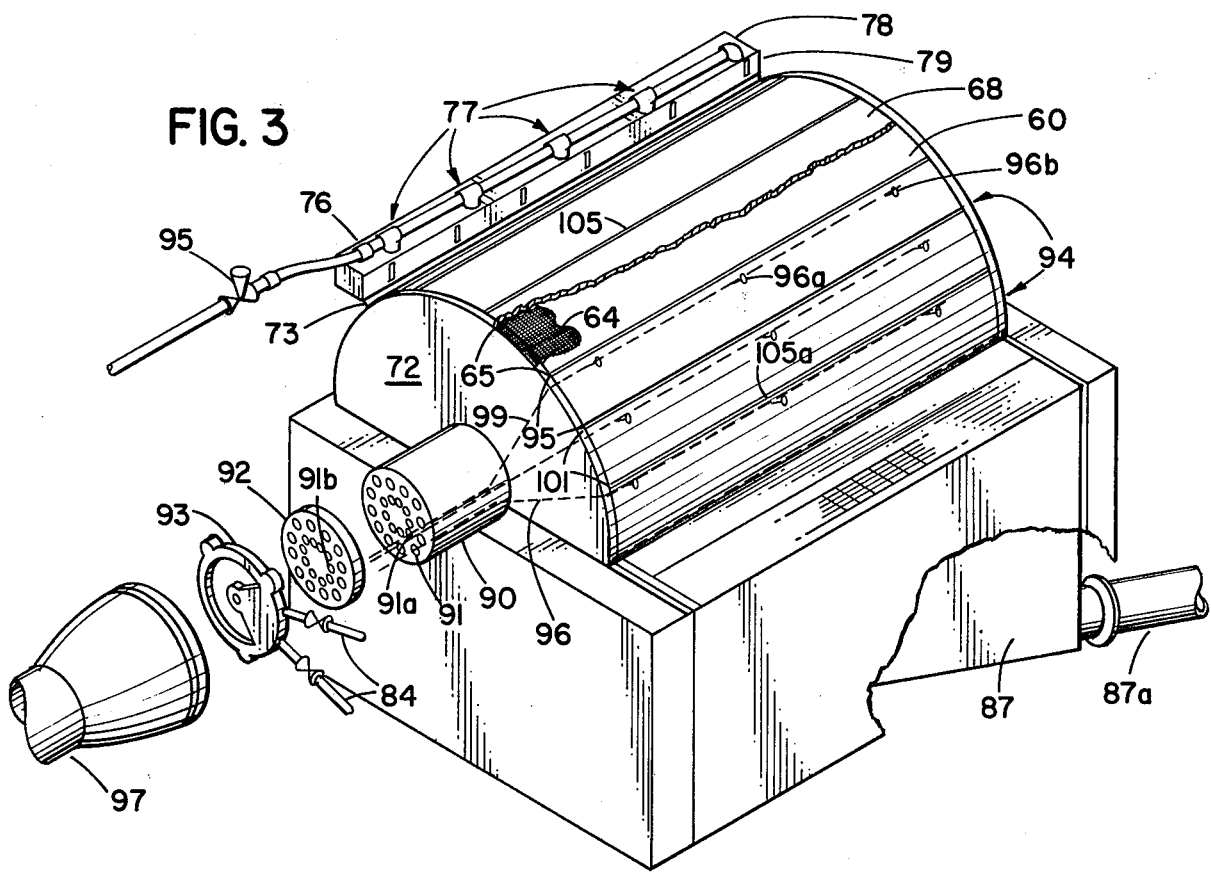

PROCESS FOR REMOVING PARTICULATE IMPURITIES FROM AQUEOUS PHOSPHORIC ACID

CROSS REFERENCE TO RELATED CASES

This application is related to copending applications Ser. No. 107,715, filed Dec. 27, 1979 by Mills et al and Ser. No. 206,785 filed Nov. 14, 1980 by Smith et al. The entire disclosure of each of said applications is hereby incorporated herein.

BACKGROUND OF INVENTION

The invention is directed to improvements in processes for filtering hot, unsaturated, saturated, or supersaturated slurry, using a vacuum filter without a precoat, especially in filtering a phosphoric acid slurry formed during the manufacture of phosphoric acid and containing typically up to about 15%, more usual 3–9%, by weight of particulate solids.

The invention involves a process for removing particulate impurities from impure aqueous phosphoric acid containing particulate impurities and comprises:

(a) passing the acid at an elevated temperature through a phosphoric acid-resistant fabric filter supported on a porous medium (preferably a rotary drum), to cause at least a portion of the particulate impurities in the acid to be filtered therefrom and to be retained by the fabric filter, thereby forming on the fabric filter a filter cake comprising said particulate impurities and entrained phosphoric acid; and (b) removing at least a portion of said filter cake comprising particulate impurities from said fabric filter (preferably while said fabric filter is still supported on said porous medium), thereby to present a fresh surface, (i.e., a surface substantially free of filter cake) of said fabric filter for subsequent filtration.

Prior to removing the filter cake it is preferred to contact at least a portion of said filter cake with a displacing liquid to remove a majority of the entrained phosphoric acid and leave a washed filter cake. The amount of the displacing fluid, its pressure, and the angle of application relative to the filter cake are preferably chosen so as to minimize penetration of the solid impurities through the fabric filter into the filtrate.

In the invention, the filter cake is preferably removed by applying a displacing fluid, such as air, steam, water or aqueous phosphoric acid, to the side of the fabric filter opposite the filter cake, thereby driving the filter cake away from the fabric filter. The filter cake can either be a product or a by-product or a waste product.

The bulk of phosphoric acid is produced by the so-called wet process method. Although there are a wide variety of wet process methods, they all basically comprise the acidulation of phosphate bearing rock with sulfuric acid to cause the precipitation of calcium sulfate and the release of crude phosphoric acid. The acid thus produced analyzes from about 22 to about 52 percent $P_2O_5$ and the lower $P_2O_5$ content phosphoric acids are usually subsequently concentrated by evaporation to so-called merchant grade. The concentrated phosphoric acid is subsequently utilized in the production of fertilizers or is subsequently treated to produce high grade phosphoric acid (such as superphosphoric acid) or other phosphates.

The unpurified phosphoric acid is relatively high in impurities including soluble and insoluble aluminum, magnesium and iron complexes. The insoluble impurities comprise very fine particles which are suspended in the unpurified acid solution, are not normally removed during the acid manufacturing process, nor are they removed by holding the crude acid in a settling tank for a commercially reasonable time, i.e., on the order of 48 to 60 hours. Consequently, the impurities are encountered in the form of a sludge in the bottom of a tank car after shipping the acid from the manufacturing site to the customer's location. The presence of this sludge often results in the rejection of the shipment by the customer or in the loss of a substantial portion of the unpurified acid when decantation of the clear acid is attempted.

The suspended sludge-forming particulate impurities are frequently of a very small particle size (e.g., dominant particle size) and pass through many types of filter media. They also can be gelatinous in nature and can quickly plug up many filter mediums. Prior art methods for purifying the phosphoric acid, such as, for example, filtration through a diatomaceous earth precoat cake, add substantially to the expense of manufacturing the acid due to the increased capital, operating, maintenance costs, loss of $P_2O_5$ values in the discarded solids and material costs, e.g., for diatomaceous earth or other filter aid for the precoat. One advantage of the present invention over such prior art methods is that it does not require a precoating of diatomaceous earth or other filter aid on the filter medium; however, it can be sometimes advantageous to include a body filter aid in the phosphoric acid prior to filtration.

It has been found, as disclosed in U.S. Patent application Ser. No. 206,785, filed Nov. 4, 1980 of Smith, et al, that by preheating the acid, followed by vacuum filtration through a filter medium including a diatomite filter cake, sludge forming particulate impurities can be removed in sufficient quantity to substantially eliminate the subsequent formation of sludge during shipping and handling of the phosphoric acid product, or of superphosphoric acid made from the filtered phosphoric acid. Sludge forming impurities can also be removed from phosphoric acid by the processes disclosed in U.S. Pat. Nos. 3,642,439; 4,136,199; 4,243,643 and 4,299,804.

U.S. Pat. No. 3,907,680 discloses a process for purifying a crude aqueous wet process produced phosphoric acid solution which includes passing the solution through a layer or bed of perlite (an aluminosilicate). The patent futher teaches that this purification technique may be accomplished via a vacuum filter. The patent does not disclose the use of a fabric filter without a filter precoat or the use of a water spray to remove entrained phosphoric acid from the filter cake. Other process in which phosphoric acid is filtered to remove solids are found (for example) in U.S. Pat. Nos. 4,164,550, and 3,528,771.

U.S. Pat. No. 4,121,968 to Wells discloses a rotary drum vacuum filter apparatus, useful for dewatering wood pulp slurries, wherein, attached to the trailing edge of the suction box, there is a discharge chamber means for discharging the dewatered cake or web from the flexible porous or foraminous belt of material covering the periphery of the filter. In operation, the belt containing the dewatered pulp cake or web passes from the surface of the drum and over an external perforated (or apertured) member which is connected to a source of pressurized air which passes through the perforations, exits through the perforations, impinges upon and passes through the belt and blows the cake or web therefrom. In the Wells apparatus the pulp cake or web is the product; whereas, in the present case the filtrate is usually the desired product and the cake is usually a waste product, although it can sometimes be used as a by-product, e.g. as a component of a fertilizer or animal feed supplement (as by the processes in U.S. Pat. No. 4,243,643 and in commonly-owned copending U.S. Patent application Ser. No. 107,715 of Mills and Newsom, filed Dec. 27, 1979).

In U.S. Pat. No. 4,121,968, the cake or web of pulp must be removed as a continuous, unbroken sheet in order to convert it into dried pulp or paper. In contrast, in the present process, there is no necessity to maintain a continuous sheet when removing the cake and it is usually preferred to use sufficient discharge fluid pressure as to cause the cake to break up on removal from the fabric filter (or belt).

With the use of rotary vacuum precoat filters, as well as other types of precoat filters, some $P_2O_5$ values can be lost in the precoating of filter aid. That is, the precoat cake can entrap and retain $P_2O_5$ values in the interstices of the cake. Pending applications Ser. No. 107,715 and U.S. Pat. Nos. 4,235,854; 4,303,524 and 4,313,919 disclose apparatus and processes for recovering such $P_2O_5$ values from the filter cake in a precoat filter. These processes and apparatus can be useful in practice of the present invention.

SUMMARY OF THE INVENTION

The invention is broadly directed to improvements in processes and apparatus for filtering hot, unsaturated, saturated, or supersaturated slurry, using a vacuum filter without a precoat, expecially in filtering a phosphoric acid slurry formed during the manufacture of phosphoric acid and containing sludgeforming solids. The invention can be used in filtering any suspended solid which is of about the same order of magnitude as the smaller particles found in aged, concentrated hemihydrate process phosphoric acid made from phosphate rock of relatively high magnesium content, or the solids (including clays) which are found suspended in pond water from phosphoric acid manufacture, especially where the pond water has been treated with lime and/or limestone.

The invention relates to a process for removing particulate impurities from aqueous phosphoric acid containing particulate impurities (typically sludgeforming impurities) and comprises:

(a) passing the acid at an elevated temperature through a phosphoric acid resistant fabric filter supported on a porous medium (preferably a rotary drum), to cause at least a portion of said particulate impurities in the acid to be filtered therefrom and to be retained by the fabric filter, thereby forming, on the surface of said fabric filter, a filter cake comprising said particulate impurities and entrained phosphoric acid; and (b) removing a portion of the filter cake from the fabric filter, thereby to present a fresh surface of the fabric filter for subsequent filtration.

It is preferred to contact at least a portion of the filter cake with a displacing fluid, preferably a liquid (e.g., water, or a dilute phosphoric acid, such as pond water), at a temperature and in an amount sufficient to cause at least a portion of the acid retained in the filter cake to pass through the filter cake, thereby forming a washed filter cake.

Preferably, the filter cake (or washed filter cake) is removed from the fabric filter by directing a stream of a discharge fluid, under pressure, against the surface of the fabric filter opposite to the surface upon which the filter cake is resting. The discharge fluid causes an increase in pressure which can cause the fabric to billow and overcomes the atmospheric pressure which aided in holding the filter cake to the fabric filter. The preferred discharge fluids include air, steam, water and aqueous phosphoric acid solutions.

The preferred apparatus for use in the process is a rotary drum vacuum filter which is fitted with a means for applying the displacing fluid to the filter cake and which, on the reverse side of the filter fabric, is fitted with a means of applying the pressurized discharge fluid to remove the filter cake. In contrast to the usual rotary drum vacuum filter, there is no need for a doctor blade (although in some circumstances a doctor blade can be used to assist in removal of the washed filter cake).

The amount of the displacing fluid, its pressure, and the angle of discharge thereof relative to the filter cake are preferably chosen so as to minimize penetration through the fabric filter of the solid impurities retained by the fabric filter.

The invention preferably involves the use of controlled amounts of a displacing fluid, such as by a spray nozzle or a distribution box, to replace phosphoric acid in the voids of a filter cake comprising particulate impurities on pressure-type (e.g. vacuum) rotary filters used to separate impurities from wet process produced phosphoric acid. For example, by carefully maintaining the amount, pressure and direction of a water spray, phosphoric acid entrained in the filter cake is displaced by the water and recovered with the bulk of the filtered acid (or filtrate), with a minimum controlled amount of dilution of the filtrate by the displacing fluid.

The process herein provides an improvement in the use of a rotary vacuum precoat filter assembly for producing a filtered liquid from an incoming feed stream of a solids-containing slurry. The rotary vacuum filter apparatus comprises a rotatable filter drum having a perforated or apertured surface, a fabric filter (without a precoat) on an outer surface of the drum, means for creating and maintaining a pressure differential across a filter cake of particulate impurities from the phosphoric acid being filtered sufficient for drawing filtrate into the drum when phosphoric acid containing particulate impurities is applied to an outer surface of the fabric filter. The apparatus preferably also includes means for applying a displacing fluid to the surface of the fabric filter opposite to the surface supporting the filter cake, and means for applying a discharge fluid under pressure to the surface of the fabric filter which is opposite to the surface supporting the filter cake, while the fabric filter is still in contact with the surface of the drum.

The discharge fluid can be applied to a selected portion of the fabric on a rotary drum by a fluid discharge means, such as by valve means. In a preferred apparatus, a rotary drum is divided at the surface into a number of compartments, by division strips (each of which is caulked) attached along the surface of the drum, extending from one end to the other, and containing tubes which extend from the axis, through the trunion, to the surface of the drum, (thereby forming a compartment wherein the surface of the cylinder is the bottom, the division strips are the walls and the top is the fabric filter). In this apparatus, the preferred valve means are adopted to selectively inject a pressurized fluid into one or more of such compartments to dislodge the filter cake on the filter fabric adjacent to a compartment without disturbing the filter cake on other compartments. The use of pressurized discharge fluid (e.g. air) injection for cake removal in the invention prevents the fabric filter from becoming blinded and thereby maintains high production rates and low product loss in the filter cake.

The process is preferably practiced using an apparatus comprising fluid distribution means, such as a fluid distribution box or a nozzle (or a number of nozzles) positioned for applying a displacing fluid on the outer surface of the filter cake. Connected to the fluid distribution means is a supply conduit for delivering the displacing fluid to the distribution means.

Optionally included along the supply conduit is a temperature control for regulating the temperature of the displacing liquid. The temperature of the displacing liquid can then be regulated for providing a spray of the displacing liquid at about the temperature of the filter cake. Such temperature regulation minimizes thermal shock to the filter cake.

The use of a water wash, as a displacing fluid, in the invention assists in the recovery of a high percentage of the feed acid. Recoveries of $P_2O_5$ available in the feed acid normally range between 96.5% and 98.5%. In cases where absolutely no dilution of the acid can be tolerated, the invention may be used without the water wash, with some reduction in recovery, or superheated steam could be used for the displacement (as by the apparatus in U.S. Pat. No. 121,968).

Production rates, when using the present invention, can be approximately four (4) times the production rates possible when compared to filtration through diatomaceous earth. High production rates are maintained with no downtime necessary for the preparation for, and precoating of, the filter drum. When the filter cake on the fabric filter is contacted with a displacing fluid (as described herein) the percent loss of $P_2O_5$ values (in the discarded, washed filter cake) is at least as low (e.g., less than 4 weight %) as when using a diatomaceous earth precoat at about the same degree of solids removed from the acid.

Capital equipment costs, operating costs, and maintenance costs can be approximately one-fourth of these costs in a diatomaceous earth filter system, not including the substantial savings involved due to the elimination of the cost of diatomaceous earth. This is primarily the result of the much higher production rates which can be attained with the present invention and because there is no need to have equipment for storing and handling diatomaceous earth or other precoat. There is also less equipment downtime.

It can be seen from the above that one aspect of the invention related to an improvement in the wet-process method for producing phosphoric acid by the acidulation with sulfuric acid of a solution or suspension of phosphorus-bearing mineral in phosphoric acid thereby to precipitate calcium sulfate and to release crude phosphoric acid containing sludge-forming impurities, separating calcium sulfate therefrom to produce a crude phosphoric acid, and thereafter concentrating said crude phosphoric acid to produce a crude, concentrated phosphoric acid containing particulate impurities and filtering the particulate impurities therefrom. In the improvement the said filtering comprises the steps of:

(a) contacting at least a portion of the surface of a first side of a fabric filter overlaying the surface of a porous support with said crude concentrated phosphoric acid while maintaining reduced pressure on a second side of said fabric filter opposite said first side, thereby filtering said crude concentrated phosphoric acid to remove at least a portion of the particulate impurities therefrom and forming, directly on the surface of said fabric filter, a filter cake comprising said particulate impurities and retained phosphoric acid;

(b) contacting at least a portion of said filter cake comprising said particulate impurities and retained phosphoric acid with a wash comprising water to remove a major portion of the retained phosphoric acid and produce a washed filter cake; and, (c) removing said washed filter cake by directing pressurized air to the second side of said fabric filter to present fresh fabric filter surface for subsequent acid contacting.

The invention can be used to filter superphosphoric acid, preferably without a wash step (due to dilution) and the resulting filter cake can be used in granular fertilizer manufacture.

BRIEF DESCRIPTION OF THE DRAWINGS

The invention herein will be better understood with regard to the following detailed description and accompanying drawings wherein:

FIG. 2 is a plan view of an embodiment of a preferred apparatus for use in the process herein; and FIG. 3 is a top plan view of the apparatus of FIG. 2.

FURTHER DESCRIPTION OF THE INVENTION

Figure 1:
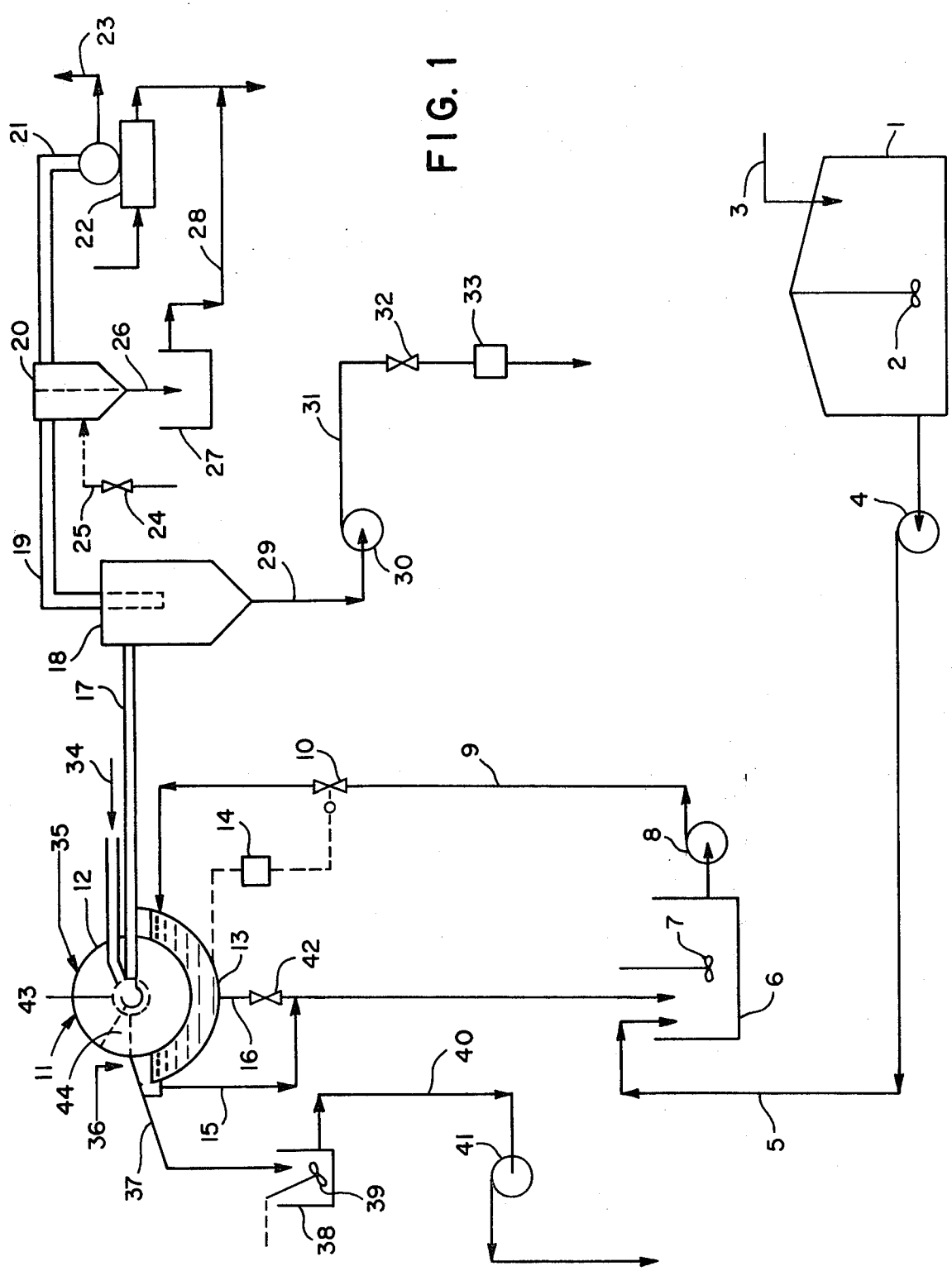
FIG. 1 is a schematic process flow sheet of a preferred embodiment of the process.

The present invention is embodied in a process for removing suspended solid impurities from wet process phosphoric acid. In accordance with the present invention, the unpurified phosphoric acid, hereinafter referred to as feed acid, is filtered preferably in a pressure-type (e.g., vacuum) filter, through a low permeability fabric filter medium (without any precoating of a filter aid, such as diatomite) to substantially reduce the quantities of suspended solid impurities contained in the feed acid. Preferably, the filtering steps are preceded by a pre-treatment and aging operation to allow increased solids precipitation prior to filtration.

Feed acid produced by the process includes substantial proportions of impurities such as calcium, determined as CaO; sulfate, determined as $SO_4$; iron, determined as $Fe_2O_3$; aluminum, determined as $Al_2O_3$; and magnesium, determined as MgO. The relative proportions of impurities contained in the feed acid are largely determined by the type of processing utilized to produce the feed acid and the nature of the phosphate-bearing rock from which the feed acid is produced. Sufficient proportions of the impurities remain in the feed acid, even after aging, to separate from the acid after a substantial period of time, forming an excessive amount of sludge. In addition, some forms of these impurities prevent the use of this acid for producing an acceptable superphosphoric acid.

The present invention is especially useful for filtering hemihydrate process acid, especially after concentration by evaporation, which has been treated in accordance with the teachings of said patents to Mills. The preferred hemihydrate process include those of U.S. Pat. Nos. 4,132,760; 4,140,748; and 4,196,172.

Prior to this invention, the purification of phosphoric acid by filtration has been considered undesirably expensive from a commercial standpoint due to the fact that the sludge forming impurities quickly blind the filter surface resulting in extremely low filtration rates and/or the added cost of the purification process when using a precoat as a filter medium. If, to prevent blinding, a relatively large mesh size or void space fabric filter had been considered, it would be thought by those skilled in the art that the very fine particles in the phosphoric acid would go through the fabric and not be retained.

In the present invention, it has been found that, by vacuum filtration through a fabric filter medium (without any precoat of filter aid), the impurities are removed in sufficient quantities to allow the acid to be used in the manufacture of a high grade superphosphoric acid. The filtrate product (i.e., the purified phosphoric acid) can also be shipped and stored over a substantial period of time without the formation of excessive sludge.

One novel feature of the present invention is that solids of an extremely small particle size are removed from the phosphoric acid when using the invention, even though the openings in the fabric filter are significantly larger than the dominant size of the particulate impurities. Particles in the low-micron range and some sub-micron particles are effectively removed.

Operable fabric filters (sometimes marketed as "Drum Filter Covers") include felts and woven fabrics (which can be monofilament or multifilament). Preferably, the fabric filter is calendered, usually on one side only, to obtain a desired permeability usually expressed as cubic feet per minute (cfm) of air. For the given filtration, the desired permeability (also sometimes called "tightness") is usually determined by experiment, by testing samples of a particular fabric which have been calendered to produce a range of permeabilities, e.g., in the range of about 2 to about 100 cfm. In general, for impure wet process phosphoric acid analyzing in the range of about 46 to about 56% (or more) $P_2O_5$, operable filters had permeabilities in the range of about 5 cfm to about 60 cfm and were calendered on one side to achieve the desired permeability. In general, for woven monofilament it is preferred to have a permeability of about 25 cfm and for multifilament weaves, about 50 cfm.

In general, the fibers of the fabric filter can be of any substance which is not appreciably degraded by the impure hot phosphoric acid being filtered. Note that impure wet process phosphoric acid can contain such corrosive impurities as HF and sulfuric acid. Among the preferred fabrics are those having fibers selected from polypropylene, polyethylene, polyesters and mixtures thereof.

The filter medium utilized in the process of the present invention is a low permeability fabric filter medium over a porous support medium. The choice of the exact permeability rating of the filter medium is dependent upon the particle size distribution of the solid impurities, upon the desired product quality, and upon the cake release ability.

For filtration of hemihydrate process phosphoric acid (especially, when concentrated by evaporation to a $P_2O_5$ analysis in the range of about 46% to about 56% by weight $P_2O_5$), the preferred fabric filter is a polypropylene felt which has been calendered on one side to obtain a permeability rating of about 5 cfm (cubic feet per minute) to about 60 cfm, such as that manufactured by National Filter Media Corporation under style 226-029-03 Drum Filter Cover. Surprisingly, for the same amount of solids removed, the flow of filtered phosphoric acid through such a felt filter can be as much as about four times as great as when filtering the same acid through a diatomaceous earth precoat. Also surprising is that the cake release can be better than with woven fabrics.

Apart from the polypropylene felt, among the useful fabric filters are those manufactured by National Filter Media Corporation, Hamden, Conn., 06514, (e.g., under the tradename "Polymax B" for polypropylene) and include Style Numbers 220-038-00; 220-005-00; 224-004-05 (which is monofilament polypropylene, 8½ oz. twill weave, noted 50 cfm); 224-071-04 (which is monofilament, 9½ oz. satin weave, rated 40 cfm); 190-016-06 (which is multifilament polyester, 11½ oz. 56×40 chain weave, rated 60 to 70 cfm); 224-058-01 (monofilament, rated 10 to 20 cfm); 220-009-09 (multifilament rated 60 cfm); 220-001-04; 220-012-02; 224-040-00; 220-034-01; and 224-026-05; and those manufactured by the United States Filter Corporation, Augusta, Ga., such as Style 17-577-055 (which is a 10 oz. multifilament rated at 55 cfm and is very similar to 220-009-09 of National Filter Media Corporation).

Preferably, only one side of the fabric filter is calendered and the impure acid is introduced on the calendered side of the fabric filter, with the vacuum (or pressurized air) being applied to the uncalendered (or less preferred, more lightly calendered), more porous surface.

With woven fabric filters (whether monofilament or multifilament) the acid flow can be as much as about twice as large as through a diatomaceous earth precoat (at about the same filtered acid quality and $P_2O_5$ recovery).

Figure 4:
FIG. 4 is a photograph of a rotary drum filter apparatus according to the present invention and shows the break-up of the washed filter cake as it begins to be discharged from the fabric filter by the pressure of a discharge fluid (air) into a segment of the drum, in the cake removal section of the filter apparatus.

Furthermore with either a felt or woven fabric filter, the $P_2O_5$ recovery of this filtration process can be better than with a precoat filtration process, when the filter cake is washed (as by a spray means or, more preferred, the water distribution box means shown in FIGS. 3 and 4) and when an air injection means is used to cause the washed filter cake to release from the fabric filter (due to release of vacuum and bellowing of fabric).

It is surprising that in woven, calendered filters, the openings in the fabric can be a square having sides in the order of about 45 microns, yet the fabric will retain impurities in the acid which have a mean diameter in the order of about 5 microns. In part, this can be achieved by permitting a small, commercially acceptable amount of such fine solids to initially pass through the fabric filter and by regulating the speed of rotation of the filter (for a given fabric and a given acid) such that a filter cake quickly builds up on the fabric filter and substantially prevents further penetration of solids through the fabric and into the filtered acid product. The rotation of the drum filter is controlled so that the filter cake does not build up to thickness, that cause unacceptably high (e.g., 8%) $P_2O_5$ losses due to ineffective washing.

For example, the revolution rate for a 12×12 foot rotary drum vacuum filter is in the range of about ½ to about 6 minutes per revolution (preferably about 1 to about 4 minutes per revolution) for producing filtered hemihydrate process phosphoric acid of no more than about 0.3 weight % solids.

By "fabric filter" or "cloth filter", it is meant either woven or nonwoven fabrics of natural or synthetic materials including cotton, plastics and metals. For example, in filtering a substantially neutral liquid fertilizer solution, cotton can be used and fabrics or cloths of metal wires (e.g., 317 stainless steel) can be used where the slurry being filtered is at too high a temperature for plastics. Other equivalent porous media are also included, such as metal or plastic, with perforations of about the same area or permeability rating as the openings in the above noted fabrics (e.g., such perforations can be made by use of a laser).

Vacuum filtration is highly preferred in the present invention. Filtering is carried out through a porous filter medium and the filtering is sometimes described herein as intermittent. That is to say, because impurities removed from the acid rapidly clog or blind the filter surface, the filtering process is interrupted at frequent intervals to remove at least a portion of the impurities, thereby exposing a fresh filter surface for subsequent filtering operation. The filter design which lends itself most readily to this type of filtration is the vacuum rotary drum filter. A vacuum rotary drum filter is highly preferred for use in the present invention since its operation particularly lends itself to intermittent filtering contact between the acid and the filter medium, and the filter is easily adapted to a pressurized air blow-type solids discharge. The use of a blow-back discharge exposes a fresh filtering surface for subsequent filtration without blinding and without the undesirable head loss when using a precoat. The low head loss experienced with this invention allows substantially higher filtration rates than previously possible.

Phosphoric acid, after treatment in accordance with this invention, is sufficiently pure to further concentrate in the production of super phosphoric acid or to produce other phosphates, or it may be shipped or stored for significant periods of time without excessive sludge formation caused by the settling of dispersed solids.

In an embodiment, the method of the present invention comprises intermittently contacting a portion of a filter element, covered by a low permeability fabric filter medium, with phosphoric acid while maintaining reduced pressure on the side of the filter element opposite the feed acid. Following contact with the impure feed acid, the layer of solids formed on the surface of the filter medium is washed with water to remove the major portion of the phosphoric acid retained by the solid impurities, and is further dried as a lower pressure continues to be maintained on the side of the filter element opposite the solids. After this step of removing liquid from the solid impurities, the major portion of the solids layer is removed by use of a pressurized air blow-back discharge. Removal of the layer of impurity solids using this method exposes a clean surface on the filter media for continued filtration without blinding of the fabric filter surface, which would result in drastically reduced filtration rates.

It should be clear that the intermittent filtering step of the present invention is not restricted to rotary drum filters. Thus, for example, the filtering step may be conducted in a batch-wise manner through a table filter or through a vacuum leaf filter with filtration interrupted when the pressure rises to a selected level or the layer of solid impurities reaches the desired thickness. A portion of, or all of, the filter solids is removed upon completion of the filtering and wash steps and a fresh filtering surface is exposed.

The apparatus herein has utility for filtering essentially any slurry wherein fine solids are suspended in liquid, to separate the liquid from the solids, and where the solids to be filtered are no smaller than about the order of magnitude of the fine solids in aged concentrated hemihydrate process phosphoric acid produced from high magnesium content phosphate rock or the solids (including clays) which are found suspended in pond water from phosphoric acid manufacture, especially where the pond water has been treated with lime and/or limestone (e.g. see U.S. Pat. No. 4,233,281). Heretofore, centrifugation has been deemed necessary to separate such solids (e.g., sludge) from pond water to make a concentrate (e.g., Synspar) for use in aiding in magnesium removal from phosphoric acid (e.g., as in U.S. Pat. No. 4,243,643). Surprisingly, the present invention can be used to successfully reduce the water content of such pond water sludge.

The apparatus is especially useful in the removal of solid impurities from a crude wet process phosphoric acid stream. In such a process, the phosphoric acid produced by the reaction of sulfuric acid with a solution or slurry of phosphate rock (which can be beneficiated, unbeneficiated, or partially beneficiated, such as by a single float) in phosphoric acid (including recycle phosphoric acid) produces a slurry of calcium sulfate in phosphoric acid. Such a slurry s generally filtered after it is removed from the reaction vessel to separate a crude phosphoric acid iquid stream from solids which essentially comprise calcium sulfate. The crude phosphoric acid, if below about 46% $P_2O_5$, is then usually concentrated by evaporation (e.g. to 46–56% $P_2O_5$), typically to so-called merchant grade, and transferred to an aging tank or settling tank wherein some solids that remain in the crude phosphoric acid can settle and are removed. These settled solids are typically very fine and difficult to separate by filtration.

As discussed above, such settling does not provide a commercially desirable method of removal of undesired fine solids (especially when low magnesium content acid is required). It has been found, especially with acid which has been treated with a calcium and fluoride containing solid as in U.S. Pat. Nos. 4,136,199 and 4,243,643, that a filtration of the crude phosphoric acid can remove impurities, in the form of solids present, to a commercially acceptable level.

In the filtration process, the crude phosphoric acid is heated to a temperature (if not already at such temperature) suitable for filtration For phosphoric acid analyzing in the range of about 38 to about 58% $P_2O_5$, such a temperature is preferably between about 50° to about 85° C. (about 122° to about 185° F.). However, higher temperatures can be used with the present invention than with a precoat filter, because the precoat is susceptible to attack by HF in the hot, crude phosphoric acid.

Lower temperature can be used for lower $P_2O_5$ analysis acids (e.g. about 26% $P_2O_5$ acid can be filtered at acceptable rates at temperatures as low as about 100° F., typically at about 120° F. or higher).

In general, for faster filtration rates, the acid should be filtered at the highest temperature attainable, but not so high as to produce appreciable attack of the filter apparatus.

The crude phosphoric acid is preferably filtered through a vacuum rotary filter. The phosphoric acid present in the crude phosphoric acid is pulled through the filter cake into the interior cavity of the drum as the filtrate. A substantial quantity of the solid impurities present in the crude phosphoric acid as solids is retained in the filter cake. For example, the impurities retained can include compounds, of fluorine, calcium, sodium, usually analytically expressed as $Na_2O$; silicon, usually analytically expressed as $SiO_2$, aluminum, magnesium, sulfur, usually expressed as $SO_4^{-2}$, heavy metals, etc.

Very fine particles containing magnesium compounds have been found in hemihydrate process phosphoric acids made from relatively high magnesium content phosphate rock. One advantage of the present process is that these very fine particles containing magnesium can be filtered in greater amounts from phosphoric acid than with the prior art diatomaceous earth precoat filtration.

In addition to retaining such impurities, there can be some $P_2O_5$ values entrapped within the interstices of the filter cake. By $P_2O_5$ values is meant compounds of phosphorus present in the crude phosphoric acid. Such entrapped $P_2O_5$ values can be recovered by the processes and apparatus in U.S. Pat. Nos. 4,235,854; 4,303,524 and 4,313,919.

Some, usually a major amount (typically 60 to 80% or more), of the soluble $P_2O_5$ values entrapped in the filter cake can be recovered by spraying a displacing liquid onto the filter cake prior to removal of the filter cake. The displacing liquid can be water, or dilute acid (e.g. "pond water"), and is delivered to the filter cake from a distribution box or from sprayers. The liquid is directed toward the filter cake, at an empirically determined rate and pressure which does not force fine solids through the filter cake and into the clarified acid product. To provide uniform coverage, the angle of spray can be adjusted by appropriate movement of the nozzles and header, or with a distribution box, by varying the angle of the distribution plate.

Dilution of the phosphoric acid is also a factor in determining the flow rate of displacing liquid through the header and nozzles. The usual maximum permissible dilution of the recovered phophoric acid filtrate is the amount of dilution that can be commercially acceptable. That is, if too great a dilution results, then an expense is encountered to reconstitute the phosphoric acid, as by evaporating the diluent. If sufficient BTU's are available for economic evaporation of the diluent, then a greater dilution can be tolerated for the amount of $P_2O_5$ recovered from the filter cake. The value of the recoverable and recovered $P_2O_5$ is also a consideration. For many phosphoric acid processes about four percent, more preferred two percent or less, is an acceptable dilution of the filtered liquid phosphoric acid product (e.g., a two percent dilution of a 50% $P_2O_5$ analysis acid would result in a 49% $P_2O_5$ analysis acid).

A method to calculate the amount of displacing liquid to spray on the filter cake is to determine the volume of filter cake removed by the pressurized discharge fluid (e.g. air) in gallons per minute. This value is then adjusted to determine the volume or percent that is liquid. The determined results provide a value for the displacement liquid that would theoretically displace 100% of the water soluble $P_2O_5$ in the filter cake. This value can be reduced or enlarged to provide the flow rate of displacement liquid for the desired recovery of $P_2O_5$ values. These numbers can vary with the drum rotation speed. For a drum about 12 feet in diameter and about 12 feet long and a rotation speed of about one rotation per minute, it has been found that for a crude acid feed of about 90 to 180 gpm a preferred flowrate of displacing liquid is about 9 to about 18 gallons per minute to recover about 75% of the $P_2O_5$ in the voids of the filter cake when filtering a crude acid containing about 45 to 56% $P_2O_5$ (at about 150° to about 185° F.).

A second distribution box can be used in the vacuum rotary filter apparatus described herein. Such a second distribution box can provide additional displacing liquid which can displace additional $P_2O_5$ values in the filter cake that were not displaced by the first application of displacing fluid.

Generally, the crude phosphoric acid is filtered at temperatures greater than ambient, such as about 120° to about 185° F. (about 50° to about 85° C.), more preferred about 130° to about 175° F. (about 54° to about 80° C.).

Because of the temperature of the phosphoric acid and filter cake, it has been found that the displacing liquid should preferably be heated to a temperature substantially equivalent to the temperature of the filter cake. The temperature differential between the spray of displacement liquid and filter cake is preferably no greater than about 15° C. and more preferably, is no greater than about 5° C. The displacement liquid can be heated by a suitable temperature regulator in the holding tank, such as a steam sparger, preferably by automated instrumentation.

The process and apparatus described above are also useful for removing finely divided solids from aqueous fertilizer solutions and suspensions and from aqueous thermal or furnace process phosphoric acids, such as those obtained by dissolving oxidized phosphorous in water or dilute phosphoric acid. Although not specifically noted, all pumps, agitators, and the like illustrated herein are driven by suitable electric motors.

DETAILED DESCRIPTION OF THE DRAWINGS

A preferred rotary vacuum filter assembly, including the air distribution valve herein, and its use in the process of the invention is herein described with regard to the accompanying drawings. Although the rotary vacuum filter herein can have utility in other processes, for ease of describing and understanding its operation it will be described herein with regard to the separation of solids from a crude phosphoric acid stream.

Purification of phosphoric acid by vacuum filtration in accordance with the preferred form of the present invention is illustrated by the FIG. 1 depicting a flow diagram. An aging tank 1 provided with an agitator 2 communicates with a source of impurity laden phosphoric acid by means of line 3. Transfer pump 4 and line 5 connect the aging tank with the feed tank 6 which is provided with an agitator 7. Acid is introduced by a filter feed pump 8 and filter feed line 9, to a rotary drum filter 11, which is provided with a rotary drum 12 and a filter tank 13 through which the rotary drum rotates. The level of acid in the filter tank 13 is sensed by a level control sensor 14 which controls the action of a level control valve 10 in line 9 to maintain the proper flow of acid to the filter tank. The filter tank 13 is also provided with an overflow line 15 which may be used to maintain a constant, set level of acid in the filter tank by recycling a portion of the acid back to the filter feed tank 6. The filter tank 13 can be drained via line 16 and valve 42 to the feed tank 6.

A vacuum pump 22 ultimately communicates with the interior of the rotary drum through line 21 to a condenser/scrubber 20, from which a line 19 connects to a filter product receiver 18 which connects via a line 17, and a valve 43, to maintain a reduced pressure within the rotary drum 12. Wash water 35 is provided to assist the removal of entrained phosphoric acid from the filter cake. Air, at a pressure above atmospheric, is injected into the cake removal section 44 through line 34 and valve 43. The removed filter cake is mixed with wash water 36 and the resulting slurry is conveyed to a cake slurry tank 38 (which contains an agitator 39) through a trough and line 37, for disposal through a line 40 and cake disposal pump 41. To increase phosphoric acid recovery, the solids in the slurry can be separated from the liquid, comprising weak phosphoric acid, as by a centrifuge. In some cases, the slurry can be used as a fertilizer component or as a component of an animal feed supplement.

Under vacuum, the filtered acid is fed into the receiver 18 via line 17 where vapors are separated from the acid. The acid is discharged from the receiver 18 through a line 29, a pump 30 and a line 31 to a receiving tank, not shown, for shipment or futher processing. A valve 32 is provided to close the line 31. A flow recorder 33 can record the quantity of product acid through the line 31.

The condenser/scrubber 20 is provided with a source of scrubbing water through a valve 24 and a line 25 and receives the gaseous materials from the receiver 18 through the line 19. The scrubber liquid is discharged through a line 26 to a seal tank 27 and then through a line 28. Uncondensable gases pass through the line 21 and are vented through line 23.

With further reference to the drawings, the improved rotary vacuum precoat filter, shown in cross-section in FIG. 2, essentially comprises a cylindrical filter drum 72 supported in a filter bowl 70 in a manner which allows rotation of the drum about its own rotational axis (which is essentially in a horizontal plane). The ends of the drum are either open spiders or closed heads which carry the two main trunions 90 which support the drum.

The drum 72 has a porous outer surface 64 which is grid-like for permitting the flow of fluid therethrough. Within the drum is at least one compartment or cavity 65. Such a cavity 65 receives the liquid filtrate and contains elements for conveying such liquid filtrate out of the drum (not shown). In FIG. 2 the curved arrow shows the (clockwise) direction of rotation and shows that the interior of the drum is divided at the surface into a number of cavities or compartments (some identified in FIG. 3 as 65, 95, 101) by division strips 105, 105a attached along the surface of the drum extending from one end to the other, and containing tubes 96, 99 which extend from the axis, through the trunion 90, to the surface of the drum 96b, 96a. Each division strip is caulked.

The porous outer surface 64 of the drum is composed of a mesh or grid (about ⅛ inch thick) and covered with a fabric filter 60 upon which the particulate solids in the phosphoric acid are retained while the acid passes through the outer surface of the fabric filter and into the drum. Preferably, the outer surface of the fabric filter is calendered. Over the fabric filter is formed a filter cake 68. The filter cake is formed of the particulate impurities in the phosphoric acid, which in some cases can include a suitable body filter aid such as diatomaceous earth, calcium sulphate, perlite, celluosic pulp, Synspar (the solids obtained by adding lime and/or limestone to phosphoric acid plant pond water) etc. The rotation speed of the drum is adjusted such that filter cake is built-up around the drum to a suitable depth for filtering the particular slurry being filtered. Generally, the filter cake is formed to a depth on the outer surface of the drum from about 1/32 inch to about ¼ inch before the wash is complete and the washed cake is removed.

The filter cake is built-up on the drum by introducing a slurry of particulate impurities in aqueous phosphoric acid to the filter bowl 70. A reduced pressure is then created in the cavity 65 which draws the particulate impurities to the outer surface of the drum. The process is continued as the drum revolves about its axis to increase the depth of the coating of particulate impurities (or filter cake).

The filter bowl 70 is positioned below and around the drum. The position of the drum in the tank is such that a lower portion of the drum is confined within the tank while an upper portion of the drum is exposed above the tank. The filter bowl 70 serves as the reservoir which contains the slurry (not shown) to be filtered by the vacuum rotary filter. Such a slurry is fed to the filter tank and from the tank is absorbed onto and through the fabric filter.

A water distribution box 78 is used as a means of providing a displacing liquid, here water, usually pond water, to displace phosphoric acid retained in the filter cake, and produce a washed filter cake. The distribution box comprises a number of wash inlet flow distributors 77, attached to a wash liquid flow distribution header 76, which connects to a wash liquid control valve 95 (to regulate the flow of water to the header, thus controlling the amount of water 75 which leaves the distributors and flows from the adjustable gates 79 in the wall of the distribution box which faces the rotary drum 72). A lip 73 (which can be adjustable as to angle) at the bottom of the distribution box aids in directing the water to the surface of the filter cake 68.

The cavity of the filter is connected to a 90 which is faced with tube sheet 91 containing filter tubes 91a through which gases in the cavity can be withdrawn through a vacuum conduit 97 connected to a vacuum pump (not shown) or barometric leg or to other evacuation means for providing a reduced pressure inside the cavity.

To provide air under pressure to the cake removal section 94, an air distribution valve 93 is fitted against the wear plate 92 to direct air from the pressurized air injection lines 84 to a filter tube outlet 91b in the wear plate which connects to a tube 91a in the trunion 90, which connects with the cavity 65 of a segment of the drum which is rotating through the cake removal section 94. It is preferred that the wear plate and air distribution valve be constructed of materials (such as polypropylene) which do not wear excessively during use. Although the valve is described as connected to a wear plate, it could be directly connected to the tube sheet 91. Similarly, although the valve is described as putting pressurized air into a single segment, it can be used to put air (or other discharge fluid) into a number of segments.

The cake removal section 94 (which can comprise one or more segmented cavities) of the filter can be relocated to any desired position by rotating the air distribution valve 93.

The portion of the filter cake 80 which separates from the surface of the fabric filter drops to a distribution trough 87 where it is mixed with sufficient pond water to form a slurry and exit via conduit 87a.

Although a water distribution box 78 (as described herein) is preferred for the washing of the cake 68, as shown in the embodiment in FIGS. 2 and 3, spray nozzles (such as those described in U.S. Pat. Nos. 4,303,524 and 4,313,919) can also be used for the water wash and would preferably be positioned substantially directly above the drum, with a plurality of nozzles to provide a spray pattern which substantially uniformly covers the length of the drum, each of the nozzles providing a spray pattern of the displacing liquid which meets each adjacent spray pattern as the spray impinges the filter cake. The spray patterns can overlap to a small extent but it is preferred that the spray patterns at least meet. If the spray patterns do not meet, then a portion of the filter cake may not be wetted with the displacing liquid. Preferably, the nozzles provide a spray pattern that is essentially fan-shaped rather than conical. Such a fan-shaped spray pattern provides an essentially even coating of the displacing liquid along a line of impingement on the filter cake. Acceptable nozzles are available commercially such as the type H-U and type U series nozzles marketed by Spraying Systems Co., of Wheaton, Ill.

The nozzles are positioned such that the direction of spray is substantially perpendicular to the direction of revolving of the drum. Because the direction of spray is toward (e.g. normal to) the filter cake, the pressure of the spray must be kept low so that it does not force small particles of sludge deep into the filter cake and cause solids penetration. The spray could also disrupt the surface of the filter cake and possibly cause channeling, if the spray pressure is too great when directed toward the filter cake.

The spray distribution box or the nozzle arrangement is supported on at least one header (not shown) which maintains the box or arrangement spaced from the drum and filter cake. The header comprises a conduit for delivering displacement liquid to the box or nozzles.

Connected to the header is a feed conduit, which can be equipped with a temperature regulator (not shown) to monitor and adjust the temperature of the displacing liquid. That is, the temperature regulator can raise or lower the temperature of the displacing liquid to avoid or inhibit thermal shock to the filter cake as the displacing liquid is sprayed onto the filter cake. The temperature regulator can be a heated reservoir or a steam sparge tank or steam injector when it is desirable to raise the temperature of the displacing liquid.

Figure 5:
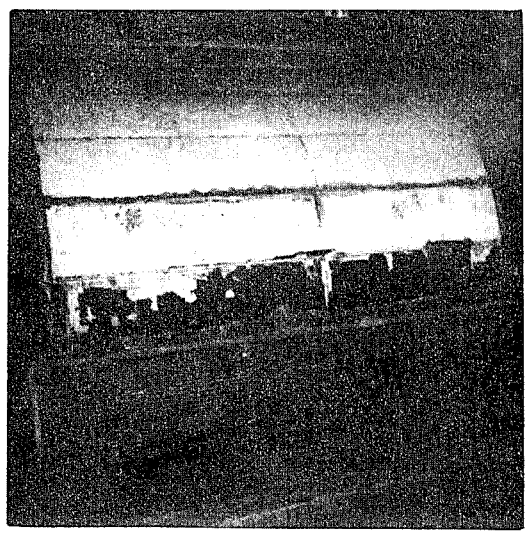
FIG. 5 is a photograph showing the cake removal from the fabric filter on a segment of the filter drum as the segment rotates past the center line of the cake removal section (indicated by an arrow).
Figure 6:
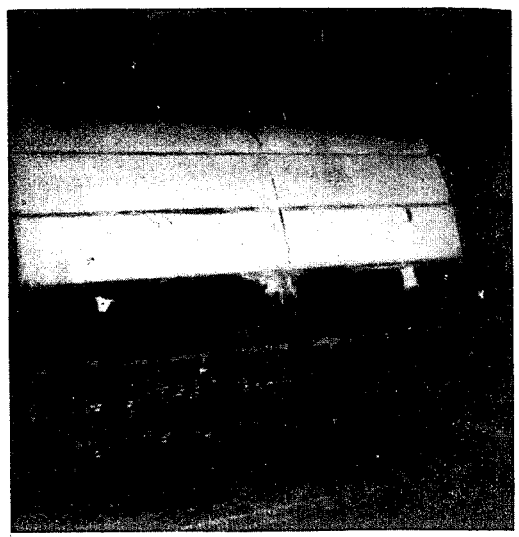
FIG. 6 shows the cake removal section of the filter apparatus after substantially all of the filter cake has been discharged from the fabric filter.

Positioned along the interior surface of the drum is a means 84 for injecting a fluid (preferably air under pressure) for removing all or a portion of the filter cake 68 from the opposite surface of the fabric filter 60 as the drum revolves past the injection means. The position of the means can be adjustable or fixed. The pressure of the fluid can be adjusted to continuously or intermittently to remove all or a portion of the filter cake from the opposite surface of the fabric filter (as is illustrated by FIGS. 4 to 6 herein). By removing the filter cake a fresh surface of the fabric filter is provided for receiving the slurry to be filtered.

Figure 7:
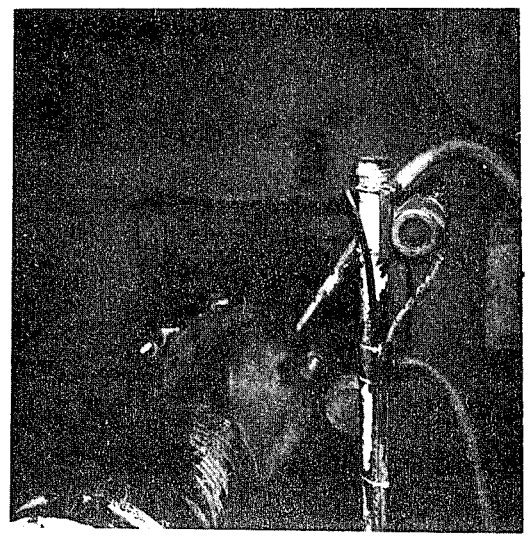
FIG. 7 is a photograph of the pressurized air connections to the air injection valve for injecting pressurized air to the interior of the rotary drum.
Figure 8:
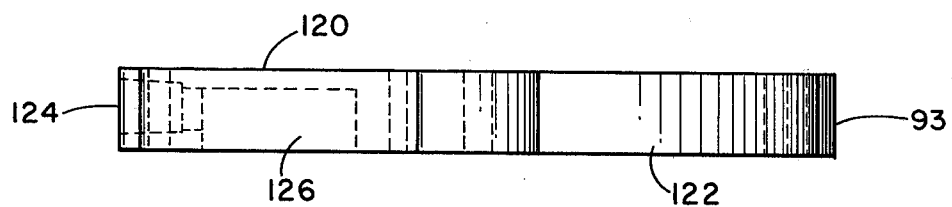
FIG. 8 is a side view of a fluid injection valve which can be used in the present invention for directing the pressurized fluid (preferably air) to a selected cake discharge segment (or segments) of the rotary drum.
Figure 9:
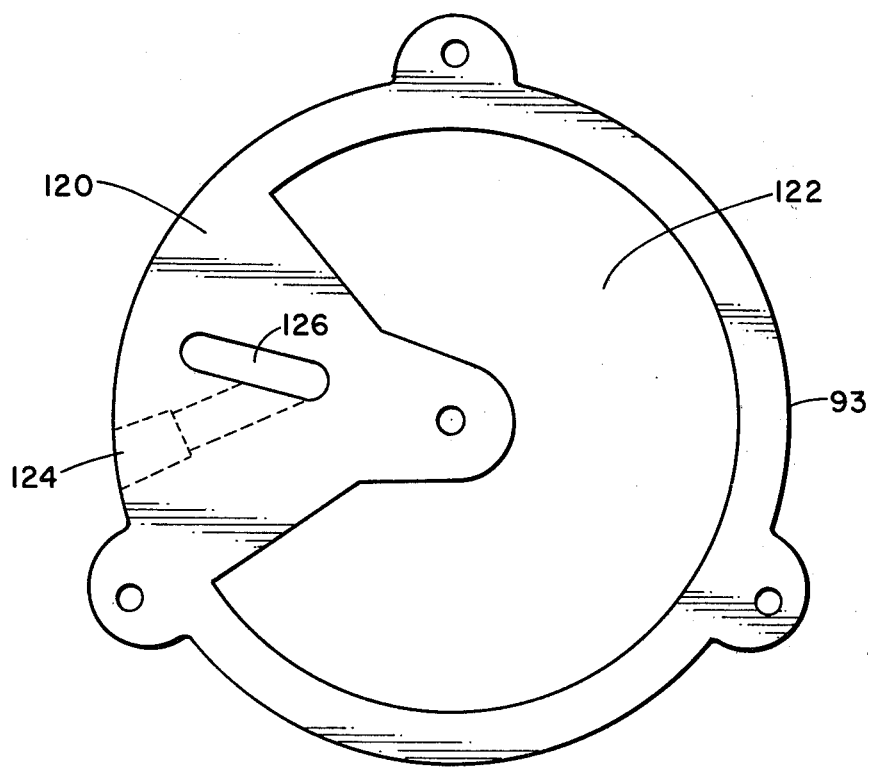
FIG. 9 is a top view of the fluid injection valve of FIG. 8

The controlled injection of the discharge fluid is conveniently effected by means of valve member 93 and the perforated wear plate 92. FIG. 7 illustrates a means of providing the discharge fluid to the valve member and FIGS. 8 and 9 show a preferred design of such a valve member for use in connection with such filters as those marketed under the Dorr-Oliver trademark. In such filters, there is an existing wear plate made of phenolic resin. It is preferred that this phenolic member be replaced with a similar member of polypropylene or other material which has better wear properties than the phenolic resin and that the valve member also be constructed of polypropylene or other material having the better wear properties than phenolic resin.

FIGS. 8 and 9, respectively, are a side view and a top view of a preferred valve 93 for injecting a discharge fluid to cause removal of the filter cake from the fabric filter. The valve comprises first conduit means 124, connected to a source of pressurized fluid (not shown), and to second conduit means 126 adapted to convey the pressurized fluid to a selected port (91b in FIG. 3) or series of ports in the wear plate (92 in FIG. 3). The valve also contains a third conduit means 122 for removing material (such as vapors) from a different port or series of ports in the wear plate and plate 120 separating conduit means 122 and 124 to prevent entry of the pressurized fluid into said third conduit means 122.

ILLUSTRATIVE EXAMPLES

The following example illustrates an embodiment of the process and apparatus for recovery of phosphoric acid values from a crude wet process phosphoric acid stream which has been treated with a precipitant comprised of compounds of calcium and fluorine, as in U.S. Pat. Nos. 4,136,199 and 4,243,643.

EXAMPLE

The feed acid was manufactured from North Florida phosphate rock in a wet-process phosphoric acid plant using the Oxy Hemihydrate process, as described, for example, in U.S. Pat. No. 4,260,584 of Ore et al. The feed acid was concentrated in force circulation evaporators and was led directly into an aging tank where a sludge precipitant from liming pond water (i.e., Synspar) was added to assist in the precipitation of impurities as solids. The feed acid was held with agitation in the aging tank for a period of 24 to 96 hours.

The flow sheet of the process used was essentially that shown in FIG. 1. Following the aging step, the acid was pumped to the filter feed tank and then to the filter tank 13 of a Dorr-Oliver rotary drum vacuum filter 11 (which was 12 feet in diameter and 12 feet long) and which was fitted with displacement wash means and means, including the valve means described herein, for providing air under pressure to remove the washed filter cake from the fabric filter.

A vacuum of about 20 inches of mercury was drawn in the interior of the drum 12 by the vacuum pump 22, drawing the acid through the fabric filter where impurities were removed, with the filtered acid being collected and moved to the receiver 18, through the line 17, where the gaseous and liquid components were separated as described above.

Simultaneous with filtering of the acid, the partially dried filter cake was contacted with wash water to assist in the release of any phosphoric acid remaining in the filter cake. The filter cake was then removed from the fabric filter by the introduction of pressurized air through valve 43. The filter cake was collected in the cake slurry tank 38.

Analysis of the filtrate and filter cake indicated that 97.74% of the $P_2O_5$ available in the feed acid was recovered in the filtrate.

A typical analysis of the impurity-containing solids in the phosphoric acid before and after filtering in accordance with the present invention is set forth in Table A below.

TABLE A

| Typical Analysis of Impurities in Phosphoric Acid - Percent by Weight | | |
|---|---|---|
| Analysis | Before Filtering | After Filtering |
| Total Solids | 6.77% | .27% |
| F | .80% | .54% |
| CaO | 1.90% | .09% |
| $SO_4$ | 6.62% | 3.25% |
| $Fe_2O_3$ | 1.47% | 1.49% |
| $Al_2O_3$ | 1.45% | 1.07% |
| MgO | .56% | .30% |

The filtered product is substantially more stable with regard to the formation of sludge and the reduction in MgO content is of particular importance in providing such stability, especially when the filtered product is further evaporated to produce superphosphoric acid.

From the foregoing analysis, it can be seen that a substantial purification of the acid was obtained after treatment in accordance with the present invention. In particular, the solids were substantially reduced to a level below that which is normally obtained when the product is centrifuged or otherwise treated to remove solids. As the analysis shows, at least 96% of the solids in the feed acid can be normally removed during filtration through a fabric filter in accordance with the present invention.

The fabric filter used during the above described example was manufactured by National Filter Media Corporation of Hamden, Conn. under their style number 226-039-03. This material is a polypropylene felt with an estimated air flow rating of 30 cfm.

Unless otherwise indicated herein, all percentages are by weight. As used herein the term "substantially reduced" means that the filtrate contains less than about 1% solids (typically less than 0.5%, e.g., 0.3%).

While the invention has been described in connection with specific embodiments thereof, it will be understood that it is capable of further modification, and this application is intended to cover any variations, uses or adaptations of the invention. It will, therefore, be recognized that the invention is not to be considered as limited to the precise embodiment shown and described, but is to be interpreted as broadly as permitted.

What is claimed is:

1. A process for removing sludge-forming particulate impurities from aqueous phosphoric acid containing sludge-forming particulate impurities, said process comprising:
   (a) passing an acid containing sludge-forming particulate impurities at an elevated temperature through a phosphoric acid resistant fabric filter supported on a porous medium to cause at least a portion of said particulate impurities in said acid to be filtered therefrom and to be retained by the fabric filter, thereby forming, directly on the surface of said fabric filter, a filter cake comprising said particulate impurities and entrained phosphoric acid;
   (b) removing the filter cake from the fabric filter by the introduction of a discharge fluid to the fabric filter on the side opposite said filter cake, thereby exposing a fresh surface of the fabric filter for subsequent filtration; and
   (c) repeating step (a) using said fresh surface of said fabric filter as said phosphoric acid resistant fabric filter.

2. The process of claim 1 wherein said discharge fluid is selected from the group comprising air, water and dilute phosphoric acid solutions.

3. The process of claim 1 wherein
   (i) said filter cake is formed over the outer surface of a fabric filter covering a porous cylinder.
   (ii) said porous cylinder is rotated during filtration so that a portion of said outer surface is contacted by said acid, for the filtration thereof,
   (iii) said formed filter cake is contacted with wash water to assist in the recovery of the entrained phosphoric acid to produce a washed filter cake, and
   (iv) said washed filter cake is removed from said fabric filter.

4. The process of claim 1 wherein said fabric filter is supported over the outer surface of a porous cylinder on a rotary vacuum filter and said cylinder is rotated so that a portion of said fabric filter is contacted by said acid for the filtration thereof.

5. The process of claim 1 wherein said phosphoric acid resistant fabric filter used in step (a) is essentially free of a precoat material.

6. The process of claim 5 wherein said fabric filter is operative to permit a flow rate of said aqueous phosphoric acid containing said sludge-forming particulate impurities equal to at least two times the flow rate of said acid through a diatomaceous earth, precoated filter while achieving at least the same amount of removal of said particulate impurities.

7. A process for removing sludge-forming impurities from wet process produced phosphoric acid, said process comprising the steps of:
   (a) filtering wet process produced phosphoric acid containing sludge-forming particulate impurities through a fabric filter whereby particulate impurities are separated from the phosphoric acid and retained on the surface of the fabric filter to form a filter cake comprising said particulate impurities and entrained phosphoric acid;
   (b) contacting the filter cake with a wash fluid to remove a major portion of the entrained phosphoric acid from said filter cake, thereby forming a washed filter cake;
   (c) removing the washed filter cake to expose a fresh surface of the fabric filter by the introduction of a discharge fluid to the fabric filter on the side opposite said filter cake, for contacting with additional phosphoric acid containing particulate impurities; and
   (d) repeating step (a) using said fresh surface of said fabric filter as said fabric filter.

8. The process of claim 5 wherein said discharge fluid is pressurized air and wherein said wash fluid comprises water.

9. The process of claim 5 wherein said fabric filter used in step (a) is essentially free of a precoat material.

10. The process of claim 9 wherein said fabric filter is operative to permit a flow rate of said wet process produced phosphoric acid containing sludge-forming particulate impurities equal to at least two times the flow rate of said acid through a diatomaceous earth, precoated filter while achieving at least the same amount of removal of said particulate impurities.

11. In the wet-process method for producing phosphoric acid by the acidulation with sulfuric acid of a solution or suspension of phosphorus-bearing mineral in phosphoric acid thereby to precipitate calcium sulfate and to release crude phosphoric acid containing sludge-forming impurities, separating calcium sulfate therefrom to produce a crude phosphoric acid, and thereafter concentrating said crude phosphoric acid to produce a crude, concentrated phosphoric acid containing particulate impurities and filtering the particulate impurities therefrom, the improvement wherein said filtering comprises the steps of:
(a) contacting at least a portion of one side of a fabric filter overlaying the surface of a porous support with said crude concentrated phosphoric acid while maintaining reduced pressure on the other side of said fabric filter, thereby filtering said crude concentrated phosphoric acid to remove at least a portion of the particulate impurities therefrom and forming, directly on the surface of said fabric filter, a filter cake comprising said particulate impurities and retained phosphoric acid;
(b) contacting at least a portion of said filter cake comprising said particulate impurities and retained phosphoric acid with a wash fluid comprising water to remove a major portion of the retained phosphoric acid and produce a washed filter cake;
(c) removing said washed filter cake by directing pressurized air to the side of said fabric filter which is opposite to said washed filter cake, thereby exposing a fresh fabric filter surface for subsequent acid contacting; and
(d) repeating step (a) using said fresh fabric filter surface as said fabric filter.

12. The process of claim 11 wherein said filter cake comprising said particulate impurities and entrained phosphoric acid is continuously contacted by wash water to cause the removal from said filter cake of the majority of said retained phosphoric acid.

13. The process of claim 7 wherein solids obtained by adding either lime or limestone or both to phosphoric acid plant pond water is added to said crude concentrated phosphoric acid prior to contacting said fabric filter with said concentrated phosphoric acid.

14. The process of claim 11 wherein said fabric filter is selected from members of the class consisting of felts and weaves of phosphoric acid resistant fibers.

15. The process of claim 11 wherein said fabric filter used in step (a) is essentially free of a precoat material.

16. The process of claim 15 wherein said fabric filter is operative to permit a flow rate of said crude concentrated phosphoric acid containing said particulate impurities equal to at least two times the flow rate of said acid through a diatomaceous earth precoated filter while achieving at least the same amount of removal of said particulate impurities.

17. In the wet-process method for producing phosphoric acid by the acidulation with sulfuric acid of a solution or suspension of a phosphorus-bearing mineral in phosphoric acid, thereby to precipitate calcium sulfate and to release crude phosphoric acid containing sludge-forming impurities, separating calcium sulfate therefrom to produce a crude phosphoric acid, and thereafter concentrating said crude phosphoric acid to produce a crude, concentrated phosphoric acid analyzing in the range of about 46% to about 56% by weight $P_2O_5$ and containing in the range of about 3% to about 15% by weight of particulate impurities, and filtering the particulate impurities therefrom, the improvement wherein said filtering comprises the steps of:
(a) supporting separate segments of fabric filter over the porous outer surface of a cylindrical drum of a rotary vacuum filter, said drum having means for defining a plurality of separate chambers within the drum, with each chamber communicating with separate segments of the fabric filter, and fluid communication means for drawing a vacuum and, alternatively, pressurizing with fluid said separate chambers, said fabric filter being a felt comprising phosphoric acid resistant fibers with calendered outer surface;
(b) contacting a portion of the outer calendered surface of a segment of fabric filter with said crude concentrated phosphoric acid at a temperature in the range of about 120° F. to about 185° F. while rotating said drum and maintaining reduced pressure on the inner surface of said segment, thereby filtering said crude concentrated phosphoric acid to remove at least a portion of the particulate impurities therefrom and forming directly on the calendered surface of said segment of fabric filter, a filter cake comprising retained phosphoric acid and at least about 96 weight % of said particulate impurities in said crude, concentrated phosphoric acid;
(c) contacing a portion of said filter cake comprising said retained phosphoric acid and particulate impurities with a wash fluid comprising water to remove a majority of the retained phosphoric acid and produce a washed filter cake containing at least about 96 weight % of said particulate impurities in said crude, concentrated phosphoric acid;
(d) removing said wahsed filter cake by directing pressurized air into the inner surface of said segment of fabric filter thereby exposing a fresh outer calendered surface of the segment for subsequent acid contacting; and
(e) repeating step (b) using said fresh outer calendered surface as said portion of said outer calendered surface of said segment of fabric filter.

18. The process of claim 17 wherein said outer calendered surface of said segment of fabric filter used in step (b) is essentially free of a precoat material.

19. The process of claim 18 wherein said fabric filter is operative to permit a flow rate of said crude concentrated phosphoric acid containing said particulate impurities equal to at least two times the flow rate of said acid through a diatomaceous earth precoated filter while achieving at least the same amount of removal of said particulate impurities.

20. A process for removing sludge-forming particulate impurities from aqueous phosphoric acid containing sludge-forming particulate impurities, said process comprising:

(a) passing an aqueous phosphoric acid containing sludge-forming particulate impurities at an elevated temperature through a phosphoric acid resistant fabric filter supported on a porous medium to cause at least a portion of said particulate impurities in said acid to be filtered therefrom and to be retained by said fabric filter, thereby forming, directly on the surface of said fabric filter, a filter cake comprising said particulate impurities and entrained phosphoric acid, wherein said fabric filter has a permeability to said aqueous phosphoric acid between about 2 and about 100 cfm, and wherein the openings in said fabric filter are significantly larger than the dominant size of said particulate impurities;

(b) removing said filter cake from said fabric filter by the introduction of a discharge fluid to the fabric filter on the side opposite said filter cake, thereby exposing a fresh surface of said fabric filter for subsequent filtration; and (c) repeating step (a) using said fresh surface of said fabric filter as said phosphoric acid resistant fabric filter.

21. A process for removing sludge-forming particulate impurities from wet process produced phosphoric acid, said process comprising the steps of:

(a) filtering wet process produced phosphoric acid containing sludge-forming particulate impurities through a fabric filter whereby particulate impurities are separated from said phosphoric acid and retained on the surface of said fabric filter to form a filter cake comprising said particulate impurities and entrained phosphoric acid, wherein said fabric filter has a permeability of said wet process produced phosphoric acid between about 2 and about 100 cfm, and wherein the openings in said fabric filter are significantly larger than the dominant size of said particulate impurities;

(b) contacting said filter cake with a wash fluid to remove a major portion of said entrained phosphoric acid from said filter cake, thereby forming a washed filter cake;

(c) removing said washed filter cake to expose a fresh surface of said fabric filter by the introduction of a discharge fluid to the fabric filter on the side opposite said filter cake, for contacting with additional wet processed phosphoric acid containing particulate impurities; and (d) repeating step (a) using said fresh surface of said fabric filter as said fabric filter.

22. In the wet process method for producing phosphoric acid by the acidulation with sulfuric acid of a solution or suspension of phosphorus-bearing mineral in phosphoric acid thereby to precipitate calcium sulfate and to release crude phosphoric acid containing sludge-forming impurities, separating calcium sulfate therefrom to produce a crude phosphoric acid, and thereafter concentrating said crude phosphoric acid to produce a crude, concentrated phosphoric acid containing particulate impurities and filtering the particulate impurities therefrom, the improvement wherein said filtering comprises the steps of:

(a) contacting at least a portion of one side of a fabric filter overlaying the surface of a porous support with said crude concentrated phosphoric acid while maintaining reduced pressure on the other side of said fabric filter, thereby filtering said crude concentrated phosphoric acid to remove at least a portion of the particulate impurities therefrom and forming, directly on the surface of said fabric filter, a filter cake comprising said particulate impurities and retained phosphoric acid, wherein said fabric filter has a permeability to said crude concentrated phosphoric acid between about 2 and about 100 cfm, and wherein the openings in said fabric filter are significantly larger than the dominant size of said particulate impurities;

(b) contacting at least a portion of said filter cake comprising said particulate impurities and said retained phosphoric acid with a wash fluid comprising water to remove a major portion of said retained phosphoric acid and produce a washed filter cake;

(c) removing said washed filter cake by directing pressurized air to the side of said fabric filter which is opposite to said washed filter cake, thereby exposing a fresh fabric filter surface for subsequent crude concentrated phosphoric acid contacting; and (d) repeating step (a) using said fresh fabric filter surface as said fabric filter.

23. In the wet-process method for producing phosphoric acid by the acidulation with sulfuric acid of a solution or suspension of a phosphorus-bearing mineral in phosphoric acid, thereby to precipitate calcium sulfate and to release crude phosphoric acid containing sludge-forming impurities, separating calcium sulfate therefrom to produce a crude phosphoric acid, and thereafter concentrating said crude phosphoric acid to produce a crude, concentrated phosphoric acid analyzing in the range of about 46% to about 56% by weight $P_2O_5$ and containing in the range of about 3% to about 15% by weight of particulate impurities, and filtering the particulate impurities therefrom, the improvement wherein said filtering comprises the steps of:

(a) supporting separate segments of a fabric filter over the porous outer surface of a cylindrical drum of a rotary vacuum filter, said drum having means for defining a plurality of separate chambers within said drum, with each chamber communicating with separate segments of said fabric filter, and fluid communication means for drawing a vacuum and, alternatively, pressurizing with a fluid said separate chambers, said fabric filter being a felt comprising phosphoric acid resistant fibers with a calendered outer surface;

(b) contacting a portion of said outer calendered surface of a segment of fabric filter with said crude concentrated phosphoric acid at a temperature in the range of about 120° F. to about 185° F. while rotating said drum and maintaining a reduced pressure on the inner surface of said segment, thereby filtering said crude concentrated phosphoric acid to remove at least a portion of said particulate impurities therefrom and forming directly on said calendered outer surface of said segment of fabric filter, a filter cake comprising retained phosphoric acid and at least about 96 weight % of said particulate impurities in said crude concentrated phosphoric acid, wherein said fabric filter has a permeability of said crude concentrated phosphoric acid between about 2 and about 100 cfm, and wherein the openings in said fabric filter are significantly larger than the dominant size of said particulate impurities;

(c) contacting a portion of said filter cake comprising said retained phosphoric acid and said particulate impurities with a wash fluid comprising water to remove a majority of said retained phosphoric acid and to produce a washed filter cake containing at least about 96 weight % of said particulate impurities in said crude concentrated phosphoric acid;

(d) removing said washed filter cake by directing pressurized air into the inner surface of said segment of fabric filter thereby exposing a fresh outer calendered surface of said segment of fabric filter for subsequent crude concentrated phosphoric acid contacting; and (e) repeating step (b) using said fresh outer calendered surface as said portion of said outer calendered surface of said segment of fabric filter.

* * * * *

UNITED STATES PATENT AND TRADEMARK OFFICE
CERTIFICATE OF CORRECTION

PATENT NO. : 4,443,421
DATED : April 17, 1984
INVENTOR(S) : Charles M. Hollifield & Teddy D. Smith It is certified that error appears in the above-identified patent and that said Letters Patent are hereby corrected as shown below:

Column 2, line 33, "Nov. 4, 1980" should be --Nov. 14, 1980--.

Column 2, line 48, "futher" should be --further.

Column 2, line 53, "process" should be --processes--.

Column 3, line 8, "application" should be --Application--.

Column 5, line 29, "U.S. Pat. No. 121,968" should be --U.S. Pat. No. 4,121,968--.

Column 10, line 42, after "slurry", "s" should be --is--.

Column 10, line 64, insert a period after "filtration".

Column 20, line 40, "contacing" should be --contacting--.

Column 20, line 47, "wahsed" should be --washed--.

Signed and Sealed this

Sixteenth Day of October 1984

[SEAL]

Attest:

GERALD J. MOSSINGHOFF

Attesting Officer

Commissioner of Patents and Trademarks